May 14, 1968  E. F. WICKENS  3,383,124

COUPLING FOR DRILL RODS

Filed April 28, 1966

INVENTOR
EDWARD F. WICKENS

United States Patent Office 3,383,124
Patented May 14, 1968

3,383,124
COUPLING FOR DRILL RODS
Edward F. Wickens, Stewartsville, N.J., assignor to Ingersoll-Rand Company, New York, N.Y., a corporation of New Jersey
Filed Apr. 28, 1966, Ser. No. 546,085
11 Claims. (Cl. 285—83)

ABSTRACT OF THE DISCLOSURE

A square drill rod and a coupling therefor. Each drill rod is provided with a female end and a male end. The male end of one drill rod slidably fits into the female end of another drill rod. Both the male end and female end are provided with diametrically opposed openings which are aligned when two rods are together. A pin is received by the aligned openings. Spring biased detent means holds the pin in place.

---

This invention relates to a coupling for a drill rod particularly adapted for use where a threaded coupling is not practicable.

In drilling holes for certain applications, it is necessary to use a rotary driving means such as a chuck which grips the drill rod. Therefore, the drill rod cannot be circular in cross-section but must be noncircular such as polygonal in shape. This allows the chuck and rod to mate and greater torque can be delivered to the drill rod. The drill rod sections must be accurately aligned in order to pass the drill rod continuously through the chuck as the rod is advanced. It is not practicable to use a threaded coupling, as is used on circular drill rods, because it would be difficult to align the sections and the joints could not be used to rotate the drill rod. Additionally, if a threaded coupling is used, it is necessary to use a power wrench to secure the coupling.

It is therefore the principal object of this invention to provide a novel coupling for hollow fluid conducting members of noncircular cross-section.

It is another object of this invention to provide a coupling for drill rod sections which does not require power tools to secure the coupling.

It is a further object of this invention to provide a coupling for drill rod sections which will not allow foreign matter to enter the drill rod or allow fluid to escape from the drill rod.

In general, these and other objects are carried out by providing a coupling for hollow members which includes a pair of axially aligned hollow sections. One of the sections has a female end portion and the other has a male end portion adapted to be slidably received by the female end portion. The male end portion has a pair of diametrically opposed openings therethrough and the female end portion has a pair of diametrically opposed openings adapted to register with the openings in the male end portion. Pin means extend through the openings. There are means for retaining the pin means in the openings and means for preventing foreign material from entering the hollow members.

The above objects will become apparent from the following description and drawings in which.

Figure 1:
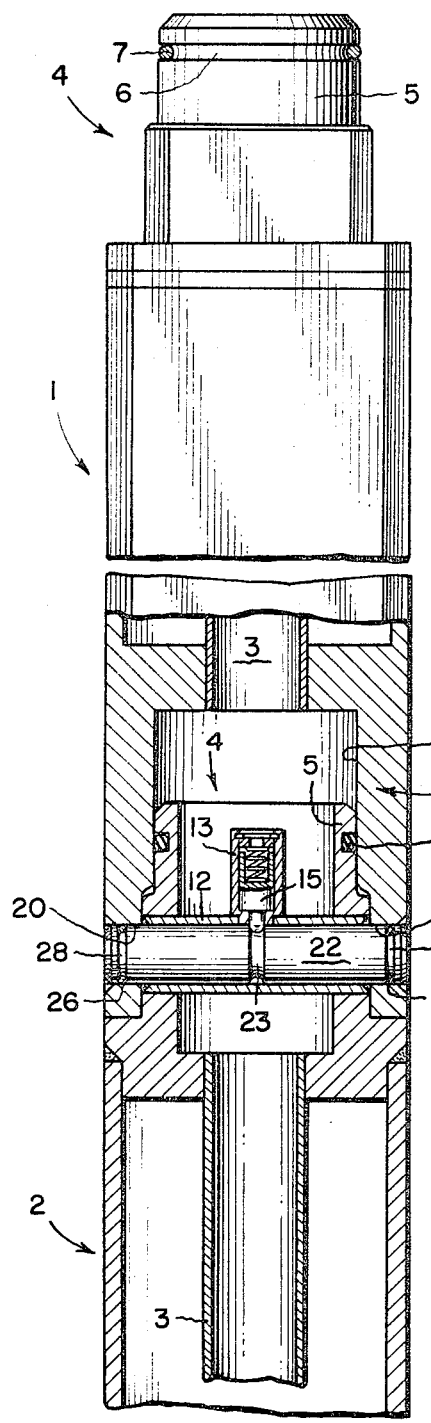
FIG. 1 is an elevation of a drill rod employing an embodiment of this invention with certain parts being broken away for purposes of clarity.
Figure 3:
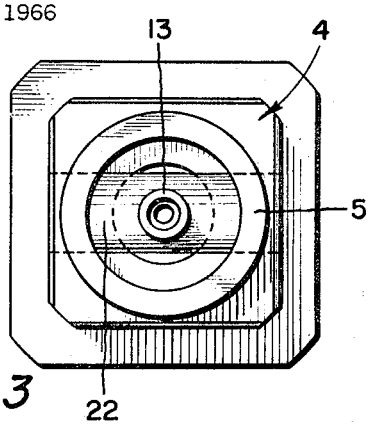
FIG. 3 is a top plan view of the apparatus of FIG. 2.

With reference to the drawing, hollow drill rod sections are generally indicated by the numerals 1 and 2. These drill rod sections are generally square in cross-section, as best shown in FIG. 3, but may be hexagonal or a polygon of any uniform shape.

Since the square drill rod sections may have an inside diameter larger than is necessary to supply fluid under pressure to exhaust chips or to operate the drills which are attached, a tubular section 3 through which fluid flows is provided on the inside of the drill rod. On smaller drill rods, this tubular section may be left out.

The male end portion 4 of the drill rod is provided with a forward end 5 which is circular in cross-section. There is an annular recess 6 which is adapted to receive an O-ring 7 made of rubber or other suitable material. This O-ring is adapted to engage a cylindrical portion 8 of the female end portion 9 of a drill rod section.

Figure 2:
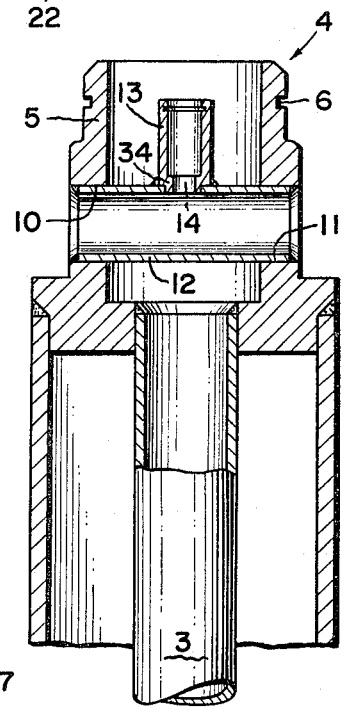
FIG. 2 is a longitudinal section of the male end portion of a drill rod section employing this invention.
Figure 4:
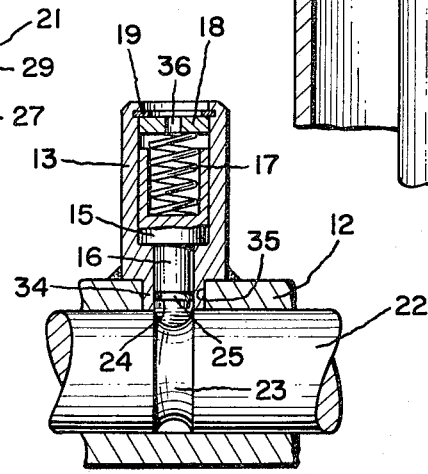
FIG. 4 is a detail of a portion of FIG. 1.

The male end portion 4 has a pair of diametrically opposed openings 10 and 11. A cylindrical tubular member 12 is secured between the two openings 10, 11 by any suitable means such as welding, as clearly shown in FIG. 2, the tubular member 12 is of such a size that fluid flowing through one drill rod section can pass around the tubular member 12 into the next drill section. The tubular member has a detent housing 13 secured thereto. The housing 13 includes a reduced diameter portion 34 adapted to be received in a hole 35 in the tubular member 12.

Mounted in the detent housing 13 is a detent. The detent comprises a cup-shaped piston member 15 slidably received in the housing 13 and having a pin 16 projecting from the bottom into an opening 14 in the portion 34 of the housing 13. Inside the cup-shaped member 15 there is a spring 17 to bias the cup member outwardly. The spring 17 engages a spring stop 18 which is held in place by a retaining ring 19. There is an opening 36 in the stop 18 to allow easy lubrication of the detent. The pin 16 is provided with an annular groove 25 adapted to receive an O-ring 24. This O-ring sealingly engages the side wall of the portion 34 of housing 13 and prevents fluid under pressure which is carried by the drill rod from escaping.

The female member is provided with a pair of diametrically opposed openings 20 and 21 for mating relation with openings 10 and 11 in the male member.

When the sections of drill rods are put together with the openings 10 and 11 in the male member in alignment with the openings 20 and 21 in the female member, a pin 22 is inserted through the openings 10 and 20, the tubular member 12 and the openings 11 and 21. The pin 22 should be the same length as the width of the drill rod sections. The pin is provided with an annular groove 23 midway of its length. This groove is adapted to receive the pin 16 which projects through a hole 14 in the detent housing 13. The pin is held against the annular groove 23 by the force of spring 17 and fluid under pressure which flows through the drill rod. The spring stop 18 and the cup member 15 act as pressure surfaces and the fluid flowing through the drill rod forces the pin against the groove 23.

To prevent dirt and other foreign matter from entering the drill rod, O-ring seals 26 and 27 are received in annular grooves 28 and 29 respectively. These O-rings sealingly engage the openings 20 and 21 respectively in the female member.

To insert the pin, it is merely necessary to strike it with a hammer or other suitable means and the detent holds it in place. To remove the pin, it is only necessary to drive it out using a drift pin and hammer.

Fluid will pass through the tubular section 3 of one drill rod section around the coupling and into the tubular section 3 of the adjacent drill rod section. Because of the various seals, fluid will not leak out of the drill rod and foreign matter will not enter the drill rod from the outside.

If desired, the female member may be provided with an opening such as 20 on each flat side so it will be easier to align the two sections of the drill rod.

This coupling may be used for tubular members other than drill rod sections. It is adapted for use wherever hollow members must be connected.

Having fully described a preferred embodiment, it will be readily apparent that a coupling for drill rods has been provided which does not require power wrench equipment and is particularly adapted for use where threaded couplings are not practicable.

It is intended that the above description be merely that of a preferred embodiment and that the invention is not limited in any way except by that which is within the scope of the appended claims.

I claim:
1. A coupling for hollow members comprising:
a pair of axially aligned hollow sections;
one of said sections having a female end portion;
the other of said sections having a male end portion adapted to be slidably received by said female end portion;
said male end portion having a pair of diametrically opposed openings therethrough;
said female end portion having a pair of diametrically opposed openings adapted to register with the openings in said male end portion;
pin means extending through said openings;
means for retaining said pin means in said openings; and
means for preventing foreign material from entering said hollow members;
said hollow sections being polygonal in shape and provided with a tubular member positioned internally thereof for conducting fluid.

2. The coupling of claim 1 wherein the upper portion of said male end portion is cylindrical and is provided with an annular groove and seal means adapted to be received by said annular groove for engaging the internal wall of said female end portion.

3. The coupling of claim 1 wherein said means for preventing foreign material from entering said hollow members includes O-ring seals at the ends of said pin means for engaging the openings in said female end portion.

4. A drill rod adapted to carry fluid under pressure comprising:
at least a pair of axially aligned hollow drill rod sections;
each of said sections having a male end portion and a female end portion;
the male end portion of one of said sections adapted to be slidably received by the female end portion of a second section;
said male end portion having a pair of diametrically opposed openings therethrough;
a hollow tubular member connecting said openings;
said female end portion having a pair of diametrically opposed openings adapted to register with the openings in said male end portion;
pin means extending through said openings and said tubular member;
said pin means being provided with an annular groove therein; and
spring biased detent means for engaging said annular groove and retaining said pin means in said openings and tubular member.

5. The drill rod of claim 4 further including means for preventing foreign material from entering said drill rod.

6. The drill rod of claim 4 wherein said drill rod sections are polygonal in shape.

7. The drill rod of claim 4 wherein said spring biased detent includes a piston slidably mounted in a housing and having a pressure surface exposed to the fluid under pressure carried by said drill rod and adapted to be forced into engagement with said annular groove by said fluid under pressure.

8. The drill rod of claim 4 wherein said detent includes means for preventing said fluid under pressure from escaping from said drill rod and said tubular member is of such a size as to allow fluid to flow from one drill rod section to another.

9. A coupling for hollow members comprising:
a pair of axially aligned hollow members;
one of said members having a female end portion with diametrically opposed openings therethrough;
the other of said members having a male end portion adapted to be slidably received by said female end portion and having diametrically opposed openings therethrough adapted to register with the openings in said female end portion;
pin means extending through said openings for retaining said hollow members together; and
a spring biased detent for engaging said pin means and retaining said pin means in said openings.

10. The coupling of claim 9 wherein said pin means is provided with an annular groove and said detent engages said groove and further comprising means for preventing foreign material from entering said hollow members.

11. The coupling of claim 10 further comprising a tubular member connecting the openings in said male end portion and said pin means extends through said tubular member.

References Cited

UNITED STATES PATENTS

| | | | |
|---|---|---|---|
| 620,833 | 3/1899 | Belcher et al. | 285—404 |
| 3,237,427 | 3/1966 | Scarborough | 64—1 |
| 3,301,581 | 1/1967 | Winberg | 285—404 |

FOREIGN PATENTS

| | | |
|---|---|---|
| 13,179 | 1911 | Great Britain. |
| 1,204,894 | 11/1965 | Germany. |

EDWARD C. ALLEN, *Primary Examiner.*

CARL W. TOMLIN, *Examiner.*

W. L. SHEDD, *Assistant Examiner.*